(12) United States Patent
Cooper

(10) Patent No.: US 11,506,327 B1
(45) Date of Patent: Nov. 22, 2022

(54) PIPE SHIELD DEVICE

(71) Applicant: Mark David Cooper, Orlando, FL (US)

(72) Inventor: Mark David Cooper, Orlando, FL (US)

( * ) Notice: Subject to any disclaimer, the term of this patent is extended or adjusted under 35 U.S.C. 154(b) by 0 days.

(21) Appl. No.: 17/729,838

(22) Filed: Apr. 26, 2022

Related U.S. Application Data

(60) Provisional application No. 63/181,028, filed on Apr. 28, 2021.

(51) Int. Cl.
*F16L 57/00* (2006.01)
(52) U.S. Cl.
CPC .................................. *F16L 57/00* (2013.01)
(58) Field of Classification Search
CPC ....................................................... F16L 57/00
USPC ............................................................ 138/89
See application file for complete search history.

(56) References Cited

U.S. PATENT DOCUMENTS

| | | | | | |
|---|---|---|---|---|---|
| 3,770,556 | A * | 11/1973 | Evans | ...................... | B29C 61/10 156/218 |
| 4,197,880 | A * | 4/1980 | Cordia | ..................... | B29C 61/04 138/178 |
| 4,555,422 | A * | 11/1985 | Nakamura | ............... | H01R 4/72 428/483 |
| 4,731,273 | A * | 3/1988 | Bonk | ....................... | C09J 7/241 428/57 |
| 5,175,032 | A * | 12/1992 | Steele | ..................... | B29C 61/10 138/104 |
| 5,302,428 | A * | 4/1994 | Steele | ..................... | F16L 59/20 428/347 |
| 5,958,529 | A * | 9/1999 | Myong | ............... | B29C 61/0608 428/179 |
| 6,433,273 | B1 * | 8/2002 | Kenyon | ................ | F16L 59/021 174/11 OR |
| 6,649,828 | B2 * | 11/2003 | Rockney | ............ | B60R 16/0215 174/107 |
| 8,927,048 | B2 * | 1/2015 | Leeflang | ........... | A61M 25/0012 427/236 |
| 9,052,042 | B2 * | 6/2015 | May | ........................ | F16L 57/06 |
| 10,836,131 | B2 * | 11/2020 | Spanjers | ................ | B65H 81/06 |
| 2009/0311456 | A1 * | 12/2009 | Harris | ..................... | B32B 27/36 428/36.1 |

* cited by examiner

*Primary Examiner* — Craig M Schneider
*Assistant Examiner* — David R Deal
(74) *Attorney, Agent, or Firm* — Jason T. Daniel, Esq.; Daniel Law Offices, P.A.

(57) ABSTRACT

A pipe shield device includes an elongated main body having a top surface, a bottom surface, a first end, a second end and a pair of side edges. The main body is constructed from stainless steel spring metal having high impact resistance and cut resistance properties. The main body includes a resilient memory and transitions between a rolled position in a resting state and an unrolled position in a non-resting state. The main body includes a spring tension for self-securement onto a pipe via the rolled memory tension.

15 Claims, 3 Drawing Sheets

PIPE SHIELD DEVICE

CROSS-REFERENCE TO RELATED APPLICATIONS

This application claims the benefit of U.S. Application Ser. No. 63/181,028 filed on Apr. 28, 2021, the contents of which are incorporated herein by reference.

TECHNICAL FIELD

The present invention relates generally to plumbing and irrigation devices, and more particularly to a pipe shield device that can be secured onto a pipe to prevent cutting of the same.

BACKGROUND

The statements in this section merely provide background information related to the present disclosure and may not constitute prior art.

Modern residences and commercial buildings have no shortage of water and irrigation lines. In most instances, these lines are constructed from PVC pipes or other plastic compounds that range in diameter depending on the volume and pressure of the fluids they are carrying. PVC is the preferred material due to its low manufacturing costs and corrosion resistance qualities.

Due to the delicate nature of these pipes, they are typically installed underground and within the building walls; however, it is not uncommon for a portion of a pipe to remain exposed. The exposed portion is typically located close to a building in order to provide access to a shut off valve, backflow device, water meter or other such item, which may be required by a respective state or local utility.

Unfortunately, the exposed portions of these pipes are often accidentally cut by lawn maintenance personnel in the operation of their duties. When damage to the pipe occurs, the supply of water through the pipe must be stopped until a repair person can cut and replace the damaged pipe. This process can be expensive and is a source of irritation to building occupants who may be without service for some time.

Accordingly, it would be beneficial to provide a pipe shield device that can function to prevent or reduce damage to pipes. It would also be beneficial if the shield device could be easily and quickly installed onto a pipe without requiring specialized knowledge or tools, so as to be useful in both commercial and residential environments.

SUMMARY OF THE INVENTION

The present invention is directed to a pipe shield device. One embodiment of the present invention can include an elongated main body having a top surface, a bottom surface, a first end, a second end and a pair of side edges. The main body can be constructed from stainless steel spring metal having excellent impact resistance and cut resistance properties.

In one embodiment, the main body can include a resilient memory and can transition between a rolled position in a resting state and an unrolled position in a non-resting state. The main body can also include a spring tension that is suitable for allowing the device to impart a self-tensioning force sufficient to maintain the device onto a pipe without movement, and without the use of tools or fasteners.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
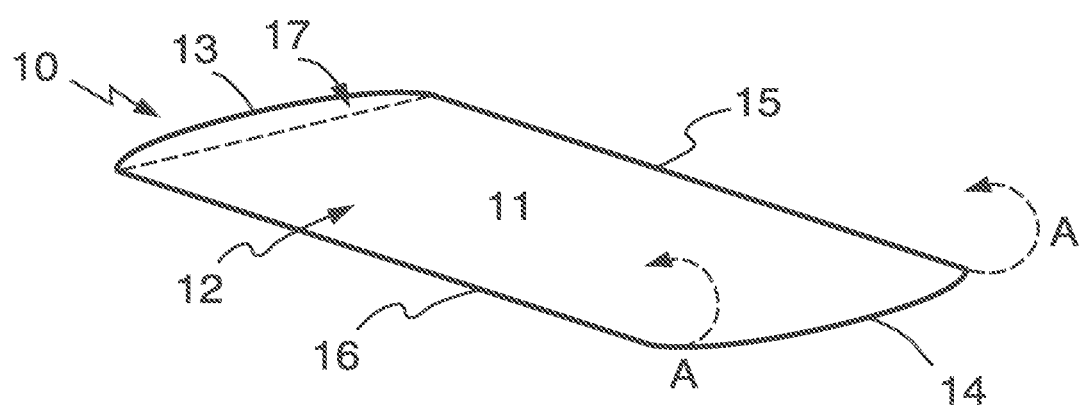
FIG. 1 is a perspective view of a pipe shield device in the unrolled position that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "resilient memory" is defined as the ability of a component to maintain a particular shape and to attempt to return to the particular shape after being bent, folded, twisted or otherwise manipulated.

FIGS. 1-5 illustrate one embodiment of a pipe shield device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 2:
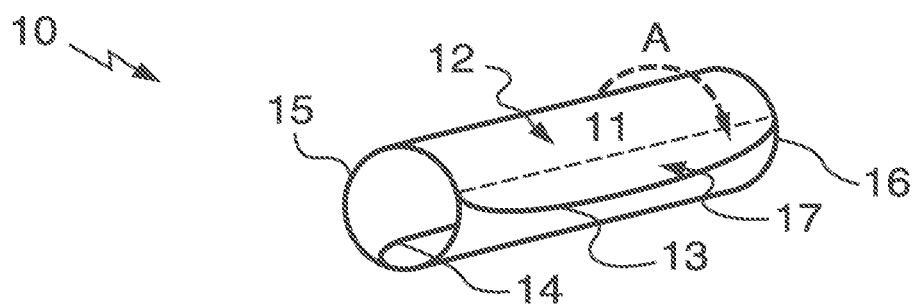
FIG. 2 is a perspective view of the pipe shield device in the rolled position, in accordance with one embodiment of the invention.

FIGS. 1 and 2 illustrate one embodiment of the device in an unrolled and rolled state, respectively. As shown, the device 10 can include an elongated body having a top surface 11, a bottom surface 12, a first end 13, a second end 14 and a pair of side edges 15 and 16.

In the preferred embodiment, the first and second ends can include a curved outer edge to ensure there are no sharp corners that could cut an individual or otherwise cause damage to a pipe to which the device is secured. As will be described below, the device can be constructed from a resilient memory material and will tend to fold (see arrows A) around itself and return to the rolled shape of FIG. 2. In the preferred embodiment, at least one of the ends can include a distal section 17 that is flat so as to not fold. Such a feature providing a lip for engaging the device when it is installed onto a pipe as shown below.

As described herein, the device 10 may conveniently be cut (e.g., by a die) from a roll sheet of a suitable material such as various metals, plastics or composites, for example, having a resilient memory to permit the device to transition between the rolled and unrolled states. To this end, the device can include any number of different shapes, sizes, lengths, widths and thickness so as to be suitable for use with virtually any sized pipe, and that are suitable for acting as a shield to resist cutting (e.g., cut resistant material) or deformation of the portion of the pipe which the device is secured.

Figure 3:
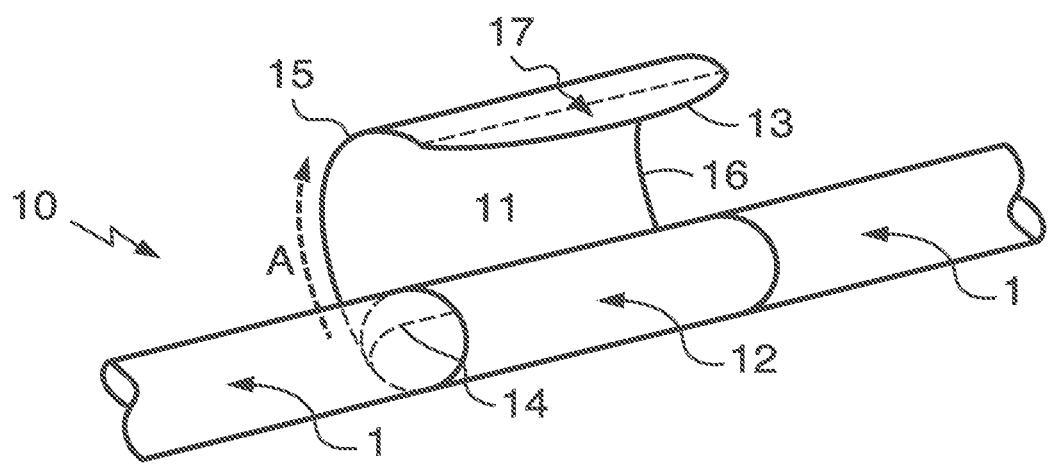
FIG. 3 is a perspective view of the pipe shield device in operation, accordance with one embodiment of the invention.
Figure 4:
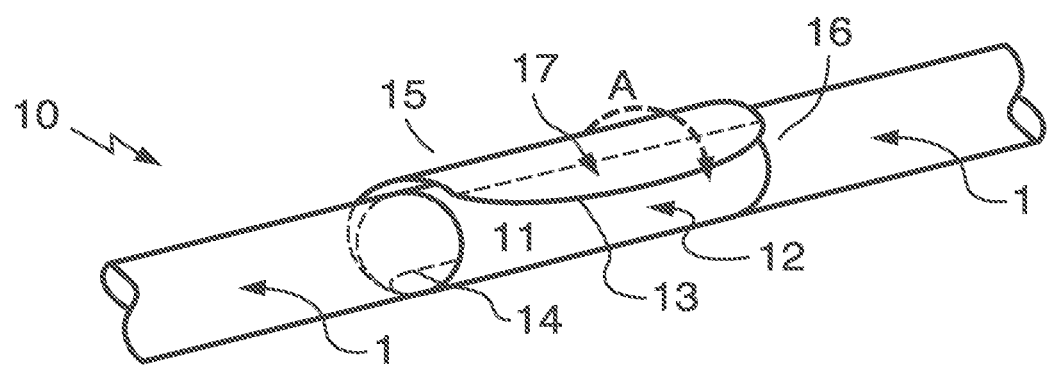
FIG. 4 is another perspective view of the pipe shield device in operation, accordance with one embodiment of the invention.

FIGS. 3 and 4 illustrate one embodiment of the device 10 in operation with a pipe 1. As shown, a user can unroll the device 10 from its resting state at FIG. 2 until one end (e.g., 14) is positioned against the curved outside surface of a pipe 1. Next, the user can allow the resilient memory of the main body to roll itself, thus encircling the pipe with the top surface 11 positioned against the body of the pipe. When so positioned, the distal section 17 will extend slightly away from the pipe in order to allow a user to grasp and remove the device when desired.

In this regard, the device 10 can be constructed to include a spring tension that imparts the rolling shape onto the main body. The spring tension also functioning to compress/squeeze the main body about the pipe with sufficient force to prevent the main body from sliding or otherwise moving along the pipe body without requiring the use of tools or mounting hardware such as glue or tape.

In the preferred embodiment the main body will be constructed from a thin (e.g., 0.01" to 0.004") roll of stainless-steel spring metal which has a resistive cutting tensile strength of at least one pound and a spring tension of about 7 pounds. Such a material and dimension are important as tests have shown this to be sufficient to resist breakage or cutting of the device 10 by the monofilament lines and/or plastic cutting blades used on commercially available gas-powered weed trimming devices, and to resist a cutting force of up to one pound applied by a metal shears. These devices—weed trimmers and cutting shears—being the two most common devices responsible for cutting exposed pipes.

In one embodiment, the device 10 can include a length (e.g., distance between first and second ends of approximately 4.5 inches. This length, along with the 7-pound spring tension being suitable for allowing the device 10 to engage and completely encircle pipes having an outside diameter of up to 1 inch without slipping or movement along the pipe.

Figure 5:
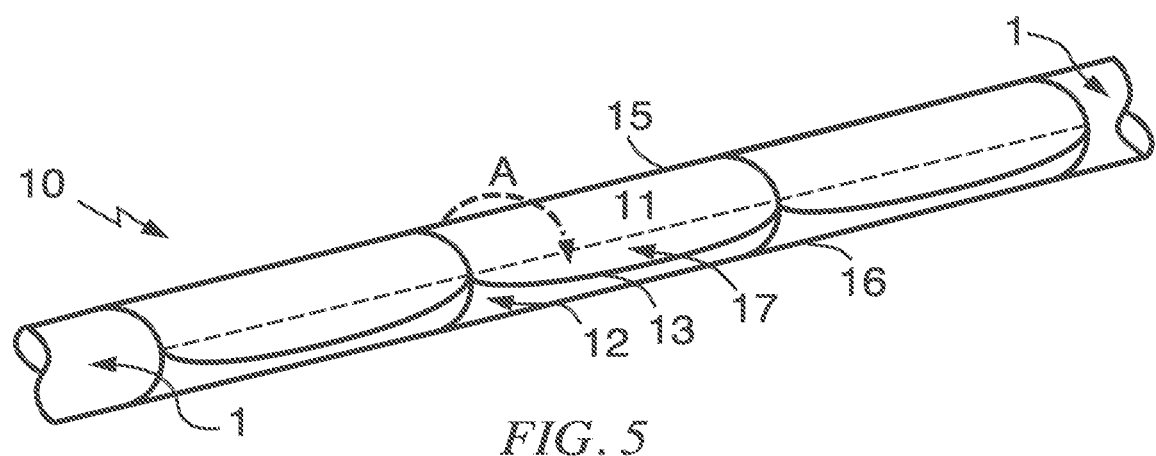
FIG. 5 is a perspective view of the pipe shield device in operation wherein a plurality of devices is used together, accordance with one embodiment of the invention.

Likewise, one embodiment of the device can include a width (e.g., distance between side edges 15 and 16) of between 1.5 inches and 5 inches, so as to be capable of protecting large portions of an exposed pipe. Of course, multiple devices can be used along the same pipe to protect pipes having any amount of exposed area as shown at FIG. 5.

Although described above for use with a PVC water pipe, the inventive concepts are not so limiting. To this end, those of skill in the art will recognize that the inventive device can be used with any type of pipe that is constructed from any type of material for use in transporting any type of fluid, gas or other substance.

Additionally, the device 10 can also be used with other items requiring protection. For example, the device 10 can be specifically used with plants, for example, whereby the main body can be wrapped around the stem of the plant to prevent the plant from being cut. Moreover, owing to the memory functionality of the device, the main body can expand—e.g., the diameter of the device in the rolled position can increase—as the diameter of the plant continues to grow. Such a feature ensuring the growth of the plant is not affected by the device 10.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A pipe shield device, comprising:
an elongated main body having a top surface, a bottom surface, a first end, a second end and a pair of side edges,
wherein the main body is configured to transition between a rolled position and an unrolled position,
wherein the main body is constructed from a resilient memory material that unaidedly rolls around itself and maintains the main body in the rolled position in a resting state, and
wherein a distal section of one of the first end or the second end is constructed to include a flat non-curved lip that extends outward from the main body when the main body is in the rolled position.

2. The device of claim 1, wherein the main body is configured to removably engage a pipe when in the rolled position.

3. The device of claim 1, wherein the main body includes a spring tension that is configured to secure the main body onto a pipe when in the rolled position.

4. The device of claim 1, wherein the main body is constructed from a cut resistant material and is configured to protect a pipe from being cut.

5. The device of claim 1, wherein the main body includes a length that is configured to encircle a pipe having a diameter of up to two inches.

6. The device of claim 1, wherein the first end of the main body includes a curved shape.

7. The device of claim 1, wherein the second end of the main body includes a curved shape.

8. The device of claim 1, wherein the resilient memory material includes a spring tension that is configured to secure the main body onto a pipe when in the rolled position, and is configured to prevent a cutting force from damaging the pipe.

9. The device of claim 1, wherein each of the first end and the second end include a continuously curving outer edge having no orthogonal edges.

10. The device of claim 1, wherein the main body is constructed from a single piece stainless-steel spring metal.

11. The device of claim 10, wherein the main body includes a resistive cutting tensile strength of at least one pound and is configured to resist breakage or cutting by a monofilament line of a weed trimming device.

12. The device of claim 10, wherein the main body includes a resistive cutting tensile strength of at least one pound and is configured to resist breakage or cutting by a plastic cutting blade of the weed trimming device.

13. The device of claim 10, wherein the main body includes a resistive cutting tensile strength of at least one pound and is configured to resist breakage or cutting by a metal shear applying one pound of cutting force onto the main body.

14. The device of claim 10, wherein the main body includes a spring tension of seven pounds and is configured to engage a pipe having an outer diameter of up to two inches.

15. The device of claim 1, wherein a diameter of the main body in the rolled position is configured to unaidedly expand and contract with an expansion and contraction of a diameter of an object to which the main body is secured.

* * * * *